UNITED STATES PATENT OFFICE.

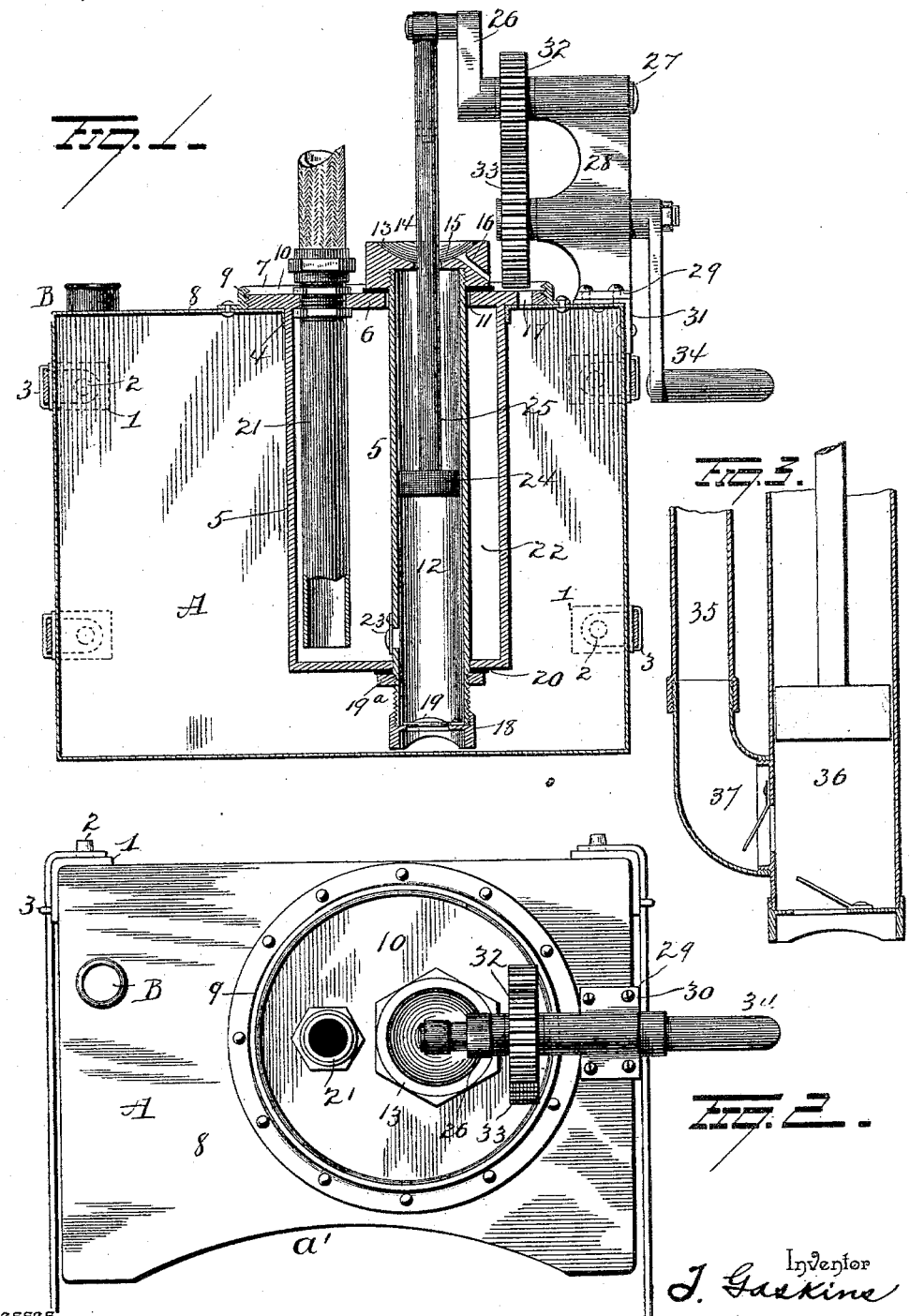

THOMAS GASKINS, OF ARCADIA, FLORIDA.

SPRINKLING APPARATUS.

SPECIFICATION forming part of Letters Patent No. 597,576, dated January 18, 1898.

Application filed June 19, 1897. Serial No. 641,445. (No model.)

*To all whom it may concern:*

Be it known that I, THOMAS GASKINS, a resident of Arcadia, in the county of De Soto and State of Florida, have invented certain new and useful Improvements in Sprinkling Apparatus; and I do hereby declare the following to be a full, clear, and exact description of the invention, such as will enable others skilled in the art to which it appertains to make and use the same.

My invention relates to an improvement in sprinkling apparatus, the object of the invention being to provide a portable apparatus for sprinkling purposes which shall be simple in construction, easy to operate, and effectual in all respects in the performance of its functions.

With this object in view the invention consists in certain novel features of construction and combinations and arrangements of parts, as hereinafter set forth, and pointed out in the claims.

In the accompanying drawings, Figure 1 is a view illustrating my improved apparatus. Fig. 2 is a sectional view illustrating the pump, and Fig. 3 is a view of a modified form.

A represents a tank, preferably having a depression $a'$ to conform to the body of the user. Several angle-irons or plates 1 are secured to the ends and one side face of the tank, and each is provided with a pin 2 and a loop 3. Suitable straps are passed around the body through the loops 3 and then attached to the pins 2 by means of holes through the straps, whereby to support the apparatus when in use; or, if desired, the apparatus may be located on a truck or wagon or other vehicle and can be readily removed from one and placed upon another; or the pump may be placed in another tank or barrel and the tank or barrel placed on a wagon or other vehicle.

The tank A is provided at or near one end thereof with an opening 4, through which the upper end of a cylinder 5 projects, said cylinder being provided at its upper end with a head 6, having a peripheral flange 7, which rests upon the top of the tank. The periphery of the flange 7 is screw-threaded, so as to screw into an internally-screw-threaded ring 9, securely riveted to the top of the tank, whereby to retain the cylinder 5 and parts connected therewith in proper position. The ring 9 is preferably somewhat deeper than the thickness of the head 6 and flange 7, so as to form a shallow basin 10, for a purpose hereinafter explained.

The head 6 of the cylinder 5 is provided centrally with an opening 11 for the passage of the upper end of the pump-pipe 12, which latter is screw-threaded at its upper end for the reception of the pump-head 13, between which and the head 6 a suitable washer 14 is inserted. The pump-head 13 is made with a bowl or recess 15 for the reception of water or other liquid which may find its way upward past the pump-piston, and from this bowl or recess the water can pass through a duct into the basin 10 and from the latter back into the tank through a suitable inlet 17. The pump-pipe 12 extends downwardly through the bottom of the cylinder 5 and terminates near the bottom of the tank, where it is provided with a removable section 18, having a valve 19 therein, and said removable section may, if desired, be screw-threaded externally for the attachment of a hose should it be desired to use the pump independently of the tank. In order to render the connection between the pump and cylinder 5 air-tight where the former passes through the bottom of the latter, I prefer to place a nut or collar $19^a$ on the pump-pipe below the cylinder and to insert a suitable washer 20 between said nut or collar and the bottom of the cylinder.

A discharge-pipe 21 is disposed in the cylinder 5 and terminates at its lower end near the bottom of said cylinder, the upper end of said discharge-pipe being made to project through the head of the cylinder and being screw-threaded at its upper end for the attachment of a suitable hose.

The space within the cylinder 5 constitutes an air-chamber 22, in which both the pump and the discharge pipe are in part located. The pump-pipe is provided within the air-chamber with a valved outlet 23, through which water entering the pump-pipe through the valved lower end thereof will flow into the air-chamber and then through the discharge-pipe to the hose in a continuous stream.

The pump is provided with a piston 24, of any suitable form of construction, and the rod 25 of said piston projects upwardly and some distance above the pump-head and is connected with a crank-arm or eccentric 26, secured to the end of a shaft 27. The shaft 27 is mounted in a standard 28, mounted on the tank, said standard being provided at its lower end with perforated flanges 29 for the reception of screws 30, by means of which said standard can be removably secured to a plate or angle-iron 31, secured to the tank. The shaft 27, to which the crank or eccentric 26 is secured, is also provided with a pinion 32, which meshes with and receives motion from a larger pinion or gear-wheel 33, secured to a shaft 33', also mounted in the standard 28. The shaft 33' is extended outwardly beyond its bearing and provided at its free end with a crank-handle 34 by means of which to turn it and thus transmit motion to the gearing and the pump-piston connected therewith.

A suitable inlet-opening B is provided in the top of the tank for the reception of the liquids to be employed.

While I prefer to employ a pump such as above described, by means of which I am enabled to throw a continuous stream of water, still it is evident that a different construction of pump might be used when a continuous stream is not desirable or necessary or when it is desired to construct a cheaper apparatus. For instance, the construction shown in Fig. 3 might be employed. In this form of pump the discharge-pipe 35 is connected with the pump-pipe 36 by means of an elbow 37, valves being located at the lower end of the pump-pipe and between the pump-pipe and elbow 37. With this construction the air-chamber is omitted.

My improvements are simple in construction and compact, can be easily put together, can be readily taken apart for repair of the parts, can be readily moved from place to place, and are effectual in all respects in the performance of their functions.

Various slight changes might be made in the details of construction of my invention without departing from the spirit thereof or limiting its scope, and hence I do not wish to limit myself to the precise details of construction herein set forth.

Having fully described my invention, what I claim as new, and desire to secure by Letters Patent, is—

1. The combination with a cylinder and a tank containing said cylinder, of a pump-pipe extending through said cylinder and communicating with the tank, a discharge-pipe terminating at its lower end in said cylinder, a valve at the lower end of the pump-pipe and a valve between said pump-pipe and the air-chamber in said cylinder, substantially as set forth.

2. The combination with an air-tight cylinder, of a pump-pipe extending through both ends of said cylinder and having a valved opening communicating therewith and a discharge-pipe terminating at its lower end within said cylinder and projecting at its upper end through the head of said cylinder, substantially as set forth.

3. The combination with a tank and a screw-threaded ring secured thereto, of a cylinder projecting into the tank and having a screw-threaded head to enter said screw-threaded ring, a pump and a discharge-pipe supported by said head and means for operating said pump, substantially as set forth.

4. The combination with a tank and an internally-screw-threaded ring secured thereto, of a cylinder projecting into the tank and having a screw-threaded head to enter said screw-threaded ring and form a basin on top the tank, a pump supported by said head of the cylinder having a recessed pump-head, a duct in said pump-head leading from the recess therein to the said basin, and a passage communicating with said basin and the interior of the tank, substantially as set forth.

5. The combination with a tank, of a cylinder located therein and having its head secured to the top of said tank, a pump-pipe extending through said cylinder, a head attached to said pump, a piston and piston-rod for the pump, and washers between the pump-pipe and cylinder, substantially as set forth.

In testimony whereof I have signed this specification in the presence of two subscribing witnesses.

THOMAS GASKINS.

Witnesses:
W. W. LANGFORD,
L. A. FORD.